United States Patent [19]

Lehmann et al.

[11] Patent Number: 5,504,227
[45] Date of Patent: Apr. 2, 1996

[54] ANTHRAQUINONE DYES, PROCESS FOR THEIR PREPARATION AND THE USE THEREOF

[75] Inventors: Urs Lehmann, Basle; Marcel Frick, Reinach, both of Switzerland

[73] Assignee: Ciba-Geigy Corporation, Tarrytown, N.Y.

[21] Appl. No.: 400,920

[22] Filed: Mar. 8, 1995

[30] Foreign Application Priority Data

Mar. 14, 1994 [CH] Switzerland ................. 743/94

[51] Int. Cl.⁶ .................................. C07C 50/34
[52] U.S. Cl. ................................. 552/219
[58] Field of Search ......................... 552/219

[56] References Cited

U.S. PATENT DOCUMENTS 3,671,176 6/1972 Kaufmann et al. .............. 552/219

FOREIGN PATENT DOCUMENTS 787716 12/1957 United Kingdom .
1195172 6/1970 United Kingdom .

*Primary Examiner*—Johann Richter
*Assistant Examiner*—John Peabody
*Attorney, Agent, or Firm*—Kevin T. Mansfield

[57] ABSTRACT

Anthraquinone dyes of formula

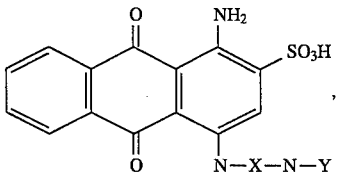

wherein $R_1$ and $R_2$ are each independently of the other hydrogen or $C_1$–$C_4$alkyl, X is a $C_2$–$C_{22}$alkylene radical which is interrupted by 1, 2 or 3 members selected from the group consisting of —NH—, —N(CH$_3$)— or —O— and which is unsubstituted or substituted by hydroxyl, sulfo or sulfato; or a $C_1$–$C_4$alkylene-phenylene-$C_1$–$C_4$alkylene radical which is unsubstituted or substituted in the phenylene ring by $C_1$–$C_4$alkyl, $C_1$–$C_4$alkoxy, $C_2$–$C_4$alkanoylamino, sulfo, halogen or carboxy, and Y is a radical of formula

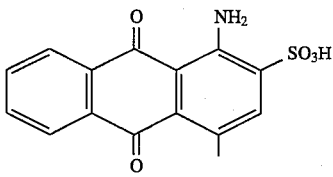

(2)

7 Claims, No Drawings

ANTHRAQUINONE DYES, PROCESS FOR THEIR PREPARATION AND THE USE THEREOF

The present invention relates to novel anthraquinone dyes, to a process for their preparation and to the use of said dyes for dyeing or printing fibre materials, in particular textile fibre materials.

The present invention relates to anthraquinone dyes of formula

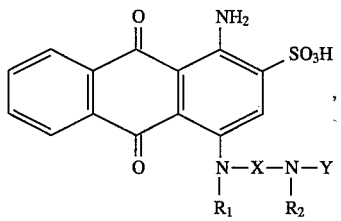

wherein $R_1$ and $R_2$ are each independently of the other hydrogen or $C_1$–$C_4$alkyl, X is a $C_2$–$C_{22}$alkylene radical which is interrupted by 1, 2 or 3 members selected from the group consisting of —NH—, —N(CH$_3$)— and —O— and which is unsubstituted or substituted by hydroxyl, sulfo or sulfato; or a radical of formula —CH$_2$—C(CH$_3$)$_2$—CH$_2$—; or a $C_1$–$C_4$alkylene-phenylene-$C_1$–$C_4$alkylene radical which is unsubstituted or substituted in the phenylene ring by $C_1$–$C_4$alkyl, $C_1$–$C_4$alkoxy, $C_2$–$C_4$alkanoylamino, sulfo, halogen or carboxy, and Y is a radical of formula

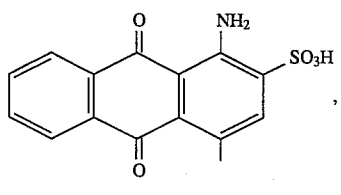

or

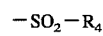

wherein $R_3$ and $R_4$ are each independently of one another $C_1$–$C_4$alkyl, or unsubstituted or substituted phenyl or naphthyl.

$R_1$, $R_2$, $R_3$ and $R_4$ defined as $C_1$–$C_4$alkyl may each independently of one another suitably be methyl, ethyl, propyl, isopropyl, butyl, sec-butyl, tert-butyl or isobutyl, preferably methyl or ethyl and, most preferably, methyl.

$R_3$ and $R_4$ defined as phenyl or naphthyl may be unsubstituted or substituted by, for example, $C_1$–$C_4$alkyl such as methyl, ethyl, propyl, isopropyl, butyl, sec-butyl, tert-butyl or isobutyl, preferably methyl; $C_1$–$C_4$alkoxy such as methoxy, ethoxy, propoxy, isopropoxy, butoxy or isobutoxy, preferably methoxy; $C_2$–$C_4$alkanoylamino such as acetylamino or propionylamino; halogen such as fluoro, chloro or bromo, preferably chloro; sulfo or carboxy.

$C_2$–$C_{22}$alkylene radicals X which are interrupted as indicated above may preferably be corresponding $C_4$–$C_{12}$alkylene radicals, more particularly corresponding $C_4$–$C_{10}$alkylene radicals. Said alkylene radicals are interrupted by 1, 2 or 3 members selected from the group consisting of —NH—, —N(CH$_3$)— and —O—, preferably by 1 or 2 members —O—. Said alkylene radicals may also be unsubstituted or substituted as indicated above. Preferably they are unsubstituted.

The $C_1$–$C_4$alkylene-phenylene-$C_1$–$C_4$alkylene radicals represented by X may be unsubstituted or substituted in the phenylene rings by $C_1$–$C_4$alkyl such as methyl, ethyl, propyl, isopropyl, butyl, sec-butyl, tert-butyl or isobutyl, preferably methyl; $C_1$–$C_4$alkoxy such as methoxy, ethoxy, propoxy, isopropoxy, butoxy or isobutoxy, preferably methoxy; $C_2$–$C_4$alkanoylamino such as acetylamino or propionylamino; halogen such as fluoro, chloro or bromo, preferably chloro; sulfo or carboxy. Preferably they are unsubstituted. The $C_1$–$C_4$alkylene radicals in these linking groups X are preferably methylene radicals. Methylene-phenylene-methylene radicals are of particular importance.

The alkylene radicals of the $C_1$–$C_4$alkylene-phenylene-$C_1$–$C_4$alkylene radicals represented by X are preferably in meta-position.

The following radicals are exemplary of the linking groups X:
—CH$_2$—C(CH$_3$)$_2$—CH$_2$—, —(CH$_2$)$_2$—O—(CH$_2$)$_2$O—(CH$_2$)$_2$—,
—(CH$_2$)$_3$—O—(CH$_2$)$_4$—O—(CH$_2$)$_3$—, —(CH$_2$)$_3$—N(CH$_3$)—(CH$_2$)$_3$—,

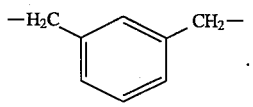

The linking group X is preferably a $C_4$–$C_{12}$ alkylene radical which is interrupted by 1, 2 or 3 members selected from the group consisting of —NH—, —N(CH$_3$)— and —O—; or a $C_1$–$C_4$alkylene-phenylene-$C_1$–$C_4$alkylene radical which is unsubstituted or substituted in the phenylene ring by $C_1$–$C_4$alkyl, $C_1$–$C_4$alkoxy, $C_2$–$C_4$alkanoylamino, sulfo, halogen or carboxy. The preferred $C_1$–$C_4$alkylene-phenylene-$C_1$–$C_4$alkylene radical is the methylene-phenylene-methylene radical which may be substituted as indicated. Preferably, this radical is unsubstituted.

The linking group X is more particularly a $C_1$–$C_4$alkylene-phenylene-$C_1$–$C_4$alkylene radical which is unsubstituted or substituted in the phenylene ring by $C_1$–$C_4$alkyl, $C_1$–$C_4$alkoxy, $C_2$–$C_4$alkanoylamino, sulfo, halogen or carboxy. The preferred $C_1$–$C_4$ alkylene-phenylene-$C_1$–$C_4$alkylene radical is the methylene-phenylene-methylene radical which is substituted as indicated. Preferably this radical is unsubstituted.

$R_1$ and $R_2$ are preferably hydrogen.

$R_3$ and $R_4$ are preferably each independently of the other $C_1$–$C_4$alkyl, or phenyl which is unsubstituted or substituted by $C_1$–$C_4$alkyl, $C_1$–$C_4$alkoxy, $C_2$–$C_4$alkanoylamino, sulfo, halogen or carboxy.

$R_3$ and $R_4$ are more particularly phenyl which is unsubstituted or substituted by $C_1$–$C_4$alkyl, $C_1$–$C_4$alkoxy, $C_2$–$C_4$alkanoylamino, sulfo, halogen or carboxy. Phenyl which is unsubstituted or substituted by $C_1$–$C_4$alkyl is most preferred.

Y is preferably a radical of formula (2) or (4). The radical of formula (2) is most preferred.

Particularly preferred anthraquinone dyes of formula (1) are those, wherein $R_1$ and $R_2$ are hydrogen, Y is a radical of formula (2), and X is a $C_4$–$C_{12}$alkylene radical which is interrupted by 1, 2 or 3 members selected from the group consisting of —NH—, —N(CH$_3$)— and —O—, or a methylene-phenylene-methylene radical which is unsubstituted or substituted in the phenylene ring by $C_1$–$C_4$alkyl, $C_1$–$C_4$alkoxy, $C_2$–$C_4$alkanoylamino, sulfo, halogen or carboxy.

Very particularly preferred anthraquinone dyes of formula (1) are those, wherein $R_1$ and $R_2$ are hydrogen, Y is a radical of formula (2), and X is a methylene-phenylene-methylene radical.

The invention further relates to a process for the preparation of the anthraquinone dyes of formula (1), which comprises reacting a compound of formula

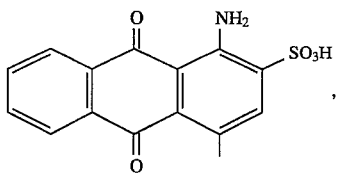 (5)

wherein Hal is halogen, preferably bromo, with an amine of formula

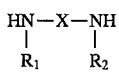 (6)

and, if Y is a radical of formula (3) or (4), reacting the product so obtained with a compound which introduces the radical of formula (3) or (4), wherein $R_1$, $R_2$, X and Y are as defined in formula (1).

The reaction of the compound of formula (5) with an amine of formula (6) is preferably carried out in aqueous medium in the temperature range from typically 25° to 100° C., preferably from 50° to 90° C., in a manner known per se, in the presence of a catalyst such as copper(I) chloride.

The radicals of formula (3) or (4) may be introduced by using compounds of formula

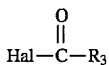 (7)

or

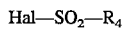 (8), wherein Hal is halogen such as chloro, and $R_3$ and $R_4$ are as defined for formula (1). Acetic anhydride is particularly suitable for introducing compounds of formula (7), wherein $R_3$ is methyl. Propionic anhydride is particularly suitable for introducing compounds of formula (7), wherein $R_3$ is ethyl.

The introduction of the radicals of formulae (7) and (8) above can be effected in a manner known per se, typically in a dipolar aprotic solvent such as acetone, dimethyl formamide or dimethyl sulfoxide in aqueous medium, or in a mixture of water with a dipolar aprotic solvent, in the temperature range from e.g. 40° to 100° C. and a pH of e.g. 7 to 12.

To prepare anthraquinone dyes of formula (1), wherein Y is a radical of formula (2), the compounds of formulae (5) and (6) are usually used in a molar ratio of about 2:1.

To prepare anthraquinone dyes of formula (1), wherein Y is a radical of formula (3) or (4), it is usual to use first an excess of the compound of formula (6). The molar ratio of the compound of formula (5) to the compound of formula (6) is conveniently from 1:4 to 1:8, preferably from 1:5 to 1:7. The intermediate so obtained is then usually isolated, e.g. by salting out or acidification and thereafter reacted with a compound which introduces the radical of formula (3) or (4).

$R_1$, $R_2$, $R_3$, $R_4$, X and Y in the compounds of formulae (6), (7) and (8) have the meanings and preferred meanings cited above.

The compounds of formulae (5), (6), (7) and (8) are known or can be prepared by methods analogous to those for preparing known compounds.

The anthraquinone dyes of formula (1) are obtained either in the form of their free acid or, preferably, in the form of their salts.

Examples of suitable salts are the alkali metal salts or ammonium salts, or the salts of an organic amine.

Typical examples are the sodium, lithium, potassium or ammonium salts, or the salt of mono-, di- or triethanolamine. The sodium salts, the lithium salts or the sodium/lithium mixed salts are of particular interest.

The novel anthraquinone dyes of formula (1) are suitable for dyeing and printing, in particular, nitrogen-containing or hydroxyl group-containing fibre materials such as textile fibre materials of cellulose, silk, synthetic polyamides and natural polyamides and, prferably, wool or synthetic polyamide, by methods known per se. It is preferred to dye or print synthetic or natural polyamide fibre material, especially wool or synthetic polyamide. The textile material indicated above can be in any form of presentation, e.g. fibre, yarn, woven or knit fabrics. The novel anthraquinone dyes of formula (1) can be used for dyeing or printing in the standard and, if desired, in previously prepared formulations. Level dyeings of brilliant shades having good allround fastness properties are obtained, in particular good fastness to rubbing, wet treatments, wet-rubbing and light. The novel anthraquinone dyes are also readily soluble in water. Furthermore, the novel anthraquinone dyes have good build-up and good compatibility with other dyes.

In the following Examples parts are by weight. The relationship between pans by weight and parts by volume is the same as that between the gram and the cubic centimeter.

EXAMPLE 1

25.54 pans of neopentyldiamine are dissolved in 350 parts of water at 50° C., and to this solution are added 1.25 parts of copper(I) chloride, 21 parts of lithium hydroxide monohydrate and 191 parts of the sodium salt of 1-amino-4-bromoanthraquinone- 2-sulfonic acid. The suspension so obtained is heated to 70° C. and, after adding 200 parts of water, stirred for c. 4 hours at this temperature. The 0.5 part of copper(I) chloride is added and strring is continued for c. 2 hours at 80° C. By addition of hydrochloric acid (32%), The pH is adjusted to c. 7.6 by addition of hydrochloric acid (32%). The reaction mixture is cooled to room temperature and left to stand over night. Subsequently the reaction mixture is stirred for 30 minutes at room temperature and at pH 8, and then the pH is adjusted to 3.8 by addition of hydrochloric acid (32%). The crystallised reaction product is collected by suction filtration and dried under vacuum at 55° C. to give a sodium/lithium mixed salt of a dye which, in the form of the free acid, is a compound of

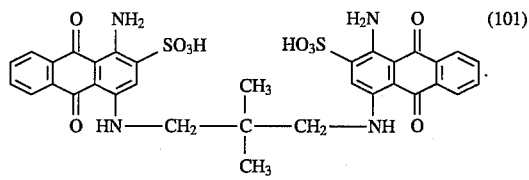 (101)

The dye of formula (101) so obtained dyes wool and synthetic polyamide fibre material in a blue shade.

EXAMPLES 2 TO 5

The general procedure of Example 1 is repeated, but using instead of 25.54 parts of neopentyldiamine an equimolar amount of a diamine of formula

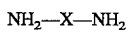  (102), wherein X has the meanings indicated in the following Table 1, column 2, to give analogous dyes of the general formula

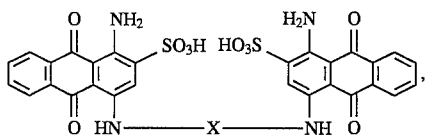  (102)

wherein X has the meanings indicated in Table 1, column 2.

The dyes listed in Table 1 dye wool and synthetic polyamide fibre material in a blue shade.

TABLE 1

| Ex. | X |
|---|---|
| 2 | $-(CH_2)_2-O-(CH_2)_2-O-(CH_2)_2-$ |
| 3 | $-(CH_2)_3-O-(CH_2)_4-O-(CH_2)_3-$ |
| 4 | $-(CH_2)_3-N(CH_3)-(CH_2)_3-$ |
| 5 | 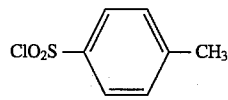 |

EXAMPLE 6

153.24 parts of neopentyldiamine are dissolved in 350 pans of water at 50° C., and to this solution are added 1.25 parts of copper(I) chloride, 21 parts of lithium hydroxide monohydrate and 191 parts of the sodium salt of 1-amino-4-bromoanthraquinone- 2-sulfonic acid. The suspension so obtained is heated to 70° C. and, after addition of 200 parts of water, stirred for c. 4 hours at this temperature. Then 0.5 part of copper(I) chloride is added and stirring is continued for c. 2 hours at 80° C. The pH is adjusted to c. 7.6 by addition of hydrochloric acid (32%) and the reaction mixture is cooled to room temperature and left to stand over night. Subsequently, the reaction mixture is stirred for 30 minutes at room temperature and at pH 8, and then the pH is adjusted to 3.8 by addition of hydrochloric acid (32%). The crystallised reaction product is collected by suction filtration and dried under vacuum at 55° C. to give a sodium/lithium mixed salt of a compound which, in the form of the free acid, is a compound of formula

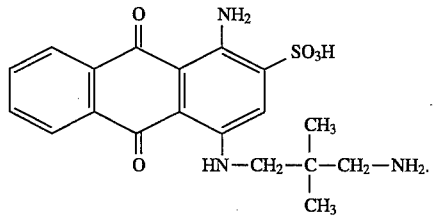  (104)

4.34 parts of the compound of formula (104), obtainable as indicated above, are dissolved in 50 parts of water and 30 parts of methoxyethan-2-ol. A total of 8.6 parts of the compound of formula (105)

ClO₂S—⟨benzene⟩—CH₃ are added in increments to this solution at 85° C. over 2 hours. The pH is adjusted to 7 to 7.5 by addition of an aqueous solution of sodium hydroxide (15%). To the reaction mixture is then added 10% of sodium chloride, based on the reaction mixture, and the batch is stirred for 30 minutes. The filter product is then collected, washed off with an aqueous solution of sodium chloride and dried in the temperature range from 50° to 60° C. to give a dye which, in the form of the free acid, is a compound of formula

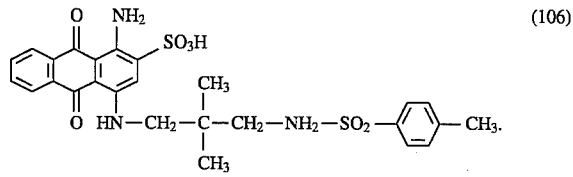  (106)

The dye of formula (106) so obtained dyes wool and synthetic polyamide in a blue shade.

Dyeing Procedure I 10 parts of polyamide 66 fabric are dyed in 500 parts of an aqueous liquor containing 2 g/l of ammonium acetate and which is adjusted to pH 5 with acetic acid. The concentration of the dye according to Example 1 is 0.7%, based on the weight of the fibre. The dyeing time at 98° C. is from 30 to 90 minutes. The dyed polyamide 66 fabric is then removed from the liquor and washed and dried in conventional manner.

The polyamide 66 fabric so obtained is dyed in a pure blue shade and has good allround fastness properties.

Dyeing Procedure II 10 parts of a polyamide 66 fabric are dyed in 500 parts of an aqueous liquor containing 1 g/l of monosodium phosphate and which is adjusted to pH 6 with disodium phosphate. The concentration of the dye according to Example 5 is 1%, based on the weight of the fibre. The dyeing time at 98° C. is from 30 to 90 minutes. The dyed polyamide 66 fabric is then removed from the liquor and washed and dried in conventional manner.

The polyamide 66 fabric so obtained is dyed in a pure blue shade and has good allround fastness properties.

Dyeing Procedure III 10 parts of woollen piece goods are dyed in 500 parts of an aqueous liquor. Based on the weight of the fabric, the liquor contains 0.45% of dye of Example 5, 5% of calcined Glauber's salt, and 2% of 80% acetic acid. The dyeing time is 30 to 60 minutes at a temperature of 98 ° C. The blue dyeing obtained on the conventionally washed and dried woollen fabric has very good allround fastness properties.

What is claimed is:

1. An anthraquinone dye of formula

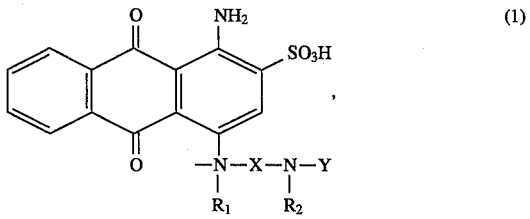  (1)

wherein

R₁ and R₂ are each independently of the other hydrogen or C₁–C₄alkyl,

X is a $C_2$–$C_{22}$alkylene radical which is interrupted by 1, 2 or 3 members selected from the group consisting of —NH—, —N(CH$_3$)— or —O— and which is unsubstituted or substituted by hydroxyl, sulfo or sulfato; or a $C_1$–$C_4$alkylene-phenylene-$C_1$–$C_4$alkylene radical which is unsubstituted or substituted in the phenylene ring by $C_1$–$C_4$alkyl, $C_1$–$C_4$alkoxy, $C_2$–$C_4$alkanoylamino, sulfo, halogen or carboxy, and Y is a radical of formula

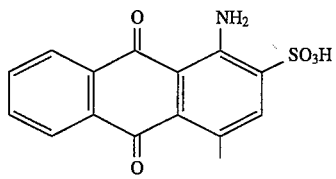
(2)

2. An anthraquinone dye according to claim 1, wherein $R_1$ and $R_2$ are hydrogen.

3. An anthraquinone dye according to claim 1, wherein

X is a $C_4$–$C_{12}$alkylene radical which is interrupted by 1, 2 or 3 members selected from the group consisting of —NH—, —N(CH$_3$)— or —O—; or a $C_1$–$C_4$alkylene-phenylene-$C_1$–$C_4$alkylene radical which is unsubstituted or substituted in the phenylene ring by $C_1$–$C_4$alkyl, $C_1$–$C_4$alkoxy, $C_2$–$C_4$alkanoylamino, sulfo, halogen or carboxy.

4. An anthraquinone dye according to claim 1, wherein

X is a methylene-phenylene-methylene radical which is unsubstituted or substituted in the phenylene ring by $C_1$–$C_4$alkyl, $C_1$–$C_4$alkoxy, $C_2$–$C_4$alkanoylamino, sulfo, halogen or carboxy.

5. An anthraquinone dye according to claim 1, wherein

X is a methylene-phenylene-methylene radical.

6. An anthraquinone dye according to claim 1, wherein $R_1$ and $R_2$ are hydrogen, and X is a $C_4$–$C_{12}$alkylene radical which is interrupted by 1, 2 or 3 members selected from the group consisting of —NH—, —N(CH$_3$)— or —O—, or a methylene-phenylene-methylene radical which is unsubstituted or substituted in the phenylene ring by $C_1$–$C_4$alkyl, $C_1$–$C_4$alkoxy, $C_2$–$C_4$alkanoylamino, sulfo, halogen or carboxy.

7. An anthraquinone dye according to claim 1, wherein $R_1$ and $R_2$ are hydrogen, and X is a methylene-phenylene-methylene radical.

* * * * *